Feb. 23, 1960 W. B. EWING 2,925,634
ADJUSTABLE BLIND FOR LIGHT OPENINGS
Filed Jan. 20, 1958 3 Sheets-Sheet 1
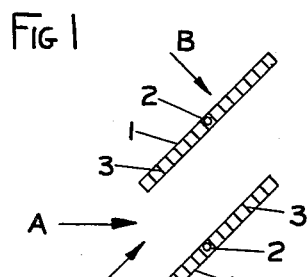
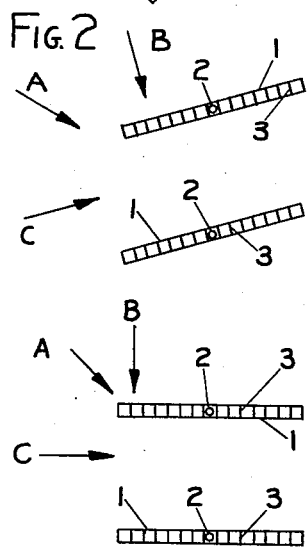
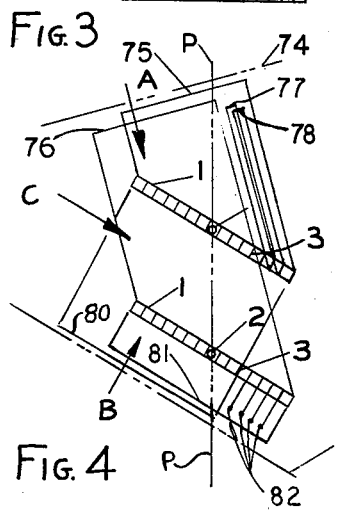
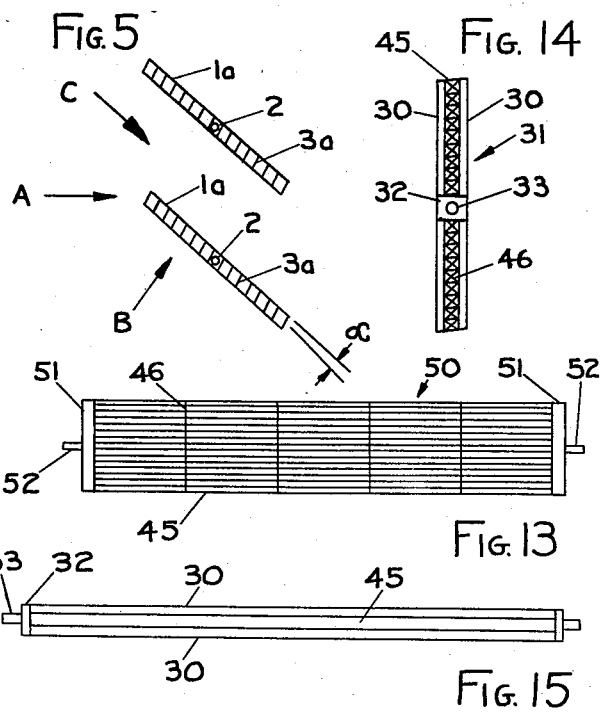
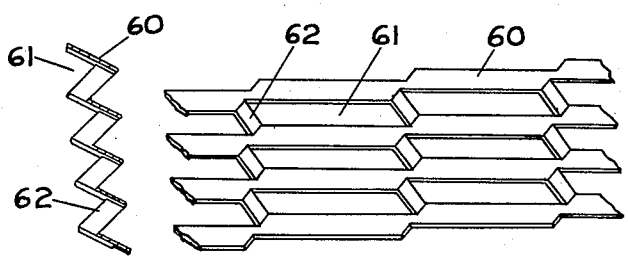
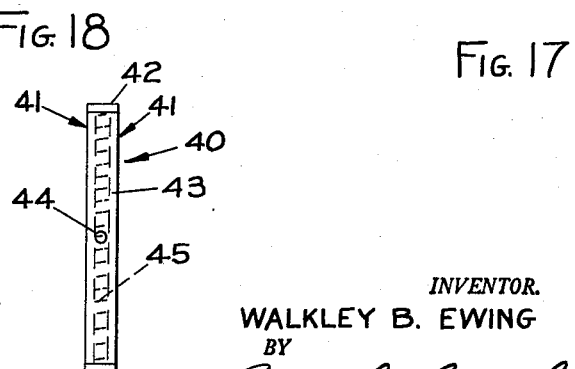
INVENTOR.
WALKLEY B. EWING
BY
ATTORNEYS

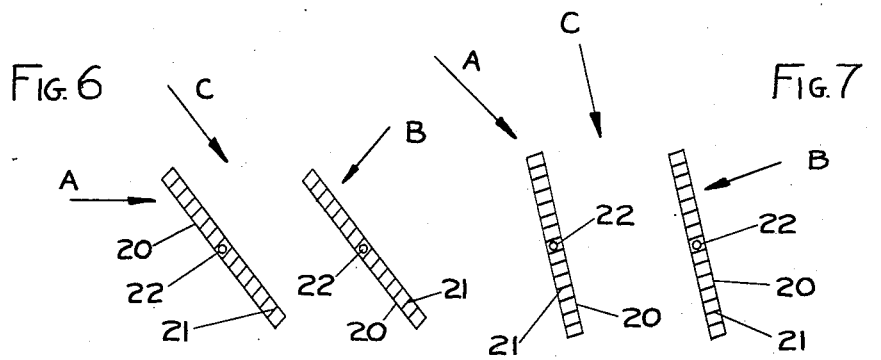
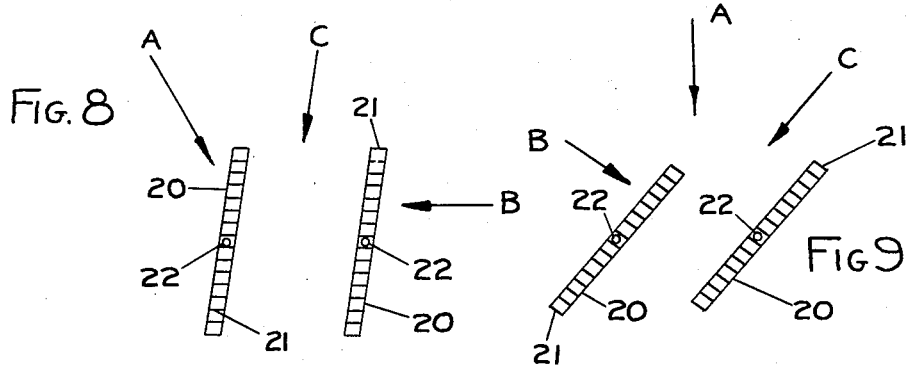
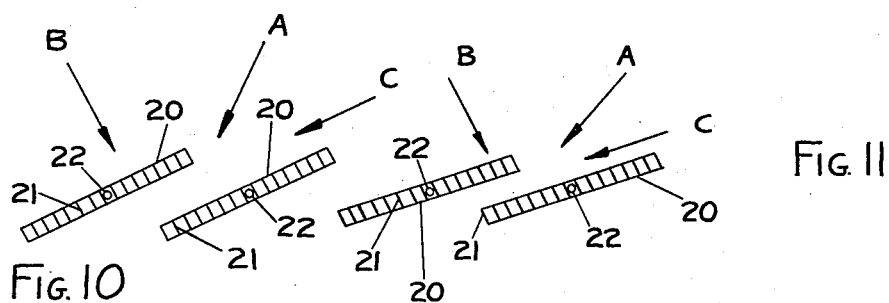
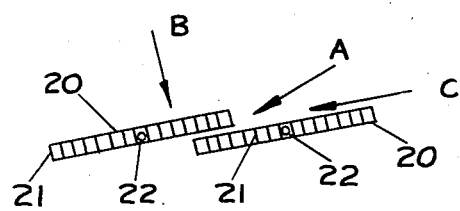

Feb. 23, 1960 W. B. EWING 2,925,634
ADJUSTABLE BLIND FOR LIGHT OPENINGS
Filed Jan. 20, 1958 3 Sheets-Sheet 3

INVENTOR.
Walkley B. Ewing
BY
ATTORNEYS weight: bold;">United States Patent Office 2,925,634
Patented Feb. 23, 1960

2,925,634

ADJUSTABLE BLIND FOR LIGHT OPENINGS

Walkley B. Ewing, Jenison, Mich., assignor to Ewing Development Company, Grand Rapids, Mich., a corporation of Michigan Application January 20, 1958, Serial No. 710,113

4 Claims. (Cl. 20—62)

This invention relates to an adjustable blind structure and more particularly to an adjustable blind having major louvers, usually adjustable about their longitudinal, central axis, composed of minor louvers and wherein the major louvers are opaque to light approaching from a given arc but transparent to light approaching from other directions. Thus, the structure is designed to provide a louver which is simultaneously both transparent and opaque to light, depending upon the light's angle of approach.

This application is a continuation-in-part of patent application Serial No. 375,697, filed August 21, 1953, now abandoned.

The conventional adjustable blind for light openings is an effective mechanism for intercepting direct sunlight. However, when the sun position is more or less normal to the plane of the blind, it is effective in the interception of sunlight only at the cost of intercepting substantially all other light such as ground reflected light or diffused skylight. A substantial portion of the opening's potential natural lighting capacity is thereby eliminated. It is the purpose of my invention to improve such blinds by eliminating this inefficiency, permitting the passage of a maximum of diffused light while eclipsing all direct sunlight.

My invention is designed to provide an adjustable blind having a narrow eclipse zone for intercepting direct sunlight. The eclipse zone is movable so that it may travel with the apparent position of the sun without substantial variation in the width of the zone.

My invention is also designed to provide an adjustable blind structure of light weight and low cost. It is designed to be easily cleaned and at the same time to prevent the by-passing of light around the louver structure by either refraction or reflection.

These and other objects and purposes of my invention will be immediately seen by those acquainted with the problems of fenestration upon reading the following specification and the accompanying drawings.

In the drawings:

Figs. 1 through 4 are diagrammatic presentations of a vertical adjustable blind embodying my invention and showing the relative position of the louvers as the angle of elevation of direct sunlight progresses from 0° to 70°.

Fig. 5 is a diagrammatic presentation of an adjustable blind embodying my invention with the minor louvers inclined 17° to the plane of the major louvers.

Figs. 6 through 12 are diagrammatic presentations of an adjustable blind type, horizontal, skylight shade showing the relative positions of the louvers as the elevation and azimuth of the sun changes from east to west.

Fig. 13 is a front elevation view of a louver consisting of a group of parallel strips supported by interwound warp threads.

Fig. 14 is an enlarged end elevation view of a louver of the same construction as that shown in Fig. 13 but encased on two sides with transparent material.

Fig. 15 is a plan view of the louver shown in Fig. 14.

Fig. 16 is an end elevation view of a louver embodying my invention and entirely encased in a transparent material.

Fig. 17 is an enlarged, fragmentary view of a louver in which the minor louvers are all stamped from a single piece of material.

Fig. 18 is an end elevation view of the louver shown in Fig. 17.

In the execution of my invention, I have provided an adjustable blind for light openings consisting of a plurality of major louvers which may be similar in size, spacing and adjustability to the louvers of a conventional adjustable blind. Each of these major louvers consists of a plurality of equally spaced, long, thin, minor louvers arranged longitudinally of the major louvers.

The minor louvers are so arranged that light traveling parallel to the face of these louvers may pass through the major louver substantially without diminution resulting from interception. The quantum of light emanating from sources on either side of a line constituting an extension of the plane of the minor louvers will be intercepted to a progressively greater degree as the angle defined between this line and the path of the approaching light increases. The spacing and width of the minor louvers is such that they will provide a narrow zone of complete light interception, i.e. an eclipse zone.

In conventional adjustable blinds light may pass between the louvers only. If the louvers of such a blind are made of light diffusing material, light would pass both between and through the major louvers. Such a blind, however, would have no eclipse zone, i.e. a zone of total light interception. In an adjustable blind constructed according to this invention, the light passes both between and through the major louvers. However, the light which passes through the major louvers does so by passing between the minor louvers. In the following description, the statement "passing through the major louvers" is used in this sense.

My invention may be constructed in many different ways to effect the objects and improvements for which it is designed. Only a few of these constructions are illustrated and described. These are to be considered illustrative rather than as specific limitations of my invention.

Since my invention may best be understood when the structure is reduced to its basic components, I first describe my invention as it appears in the diagrammatic presentations of Figs. 1 through 4. In these figures the arrow A designates the direction of direct solar radiation, the arrow B the direction of maximum light passing through the major louvers and the arrow C the direction of maximum light passing between the major louvers.

The blind (Figs. 19 and 20) consists of a plurality of equally spaced, elongated, major louvers 1. The major louvers 1 are, in cross-section, thin rectangles having a dimension, transversely of the blind, substantially greater than their thickness. The major louvers 1 are mounted by the pivot pins 2 for rotation on the side supports 70 about a rotatable axis such as at their longitudinal centerlines. The center spacing between the major louvers 1 is dependent upon the width of the louvers and the length of the arc desired for the eclipse zone. The length of the major louvers will depend upon the width of the opening to be protected.

Figure 19:
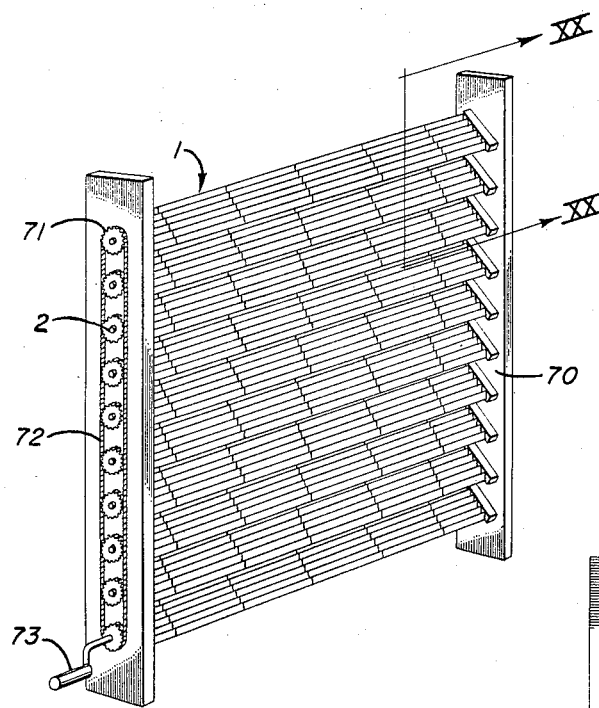
Fig. 19 is a perspective view of the adjustable blind unit of this invention.
Figure 20:
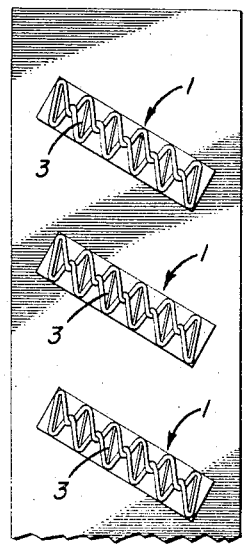
Fig. 20 is a cross sectional view taken along the plane XX—XX of Fig. 19.

The major louvers 1 can be individually rotatably adjustably or adjustable in unison, such as shown by the construction of Fig. 19 which discloses the pinion gears 71 attached to the end of one of the pins 2 of each louver, such gears being engaged by chain 72 and rotatable in unison by turning the crank 73 on the lowermost gear.

Each of the major louvers 1 is composed of a plurality of elongated, thin, parallel, minor louvers 3. Like the major louvers 1, the minor louvers 3 are rectangular in cross-section, having a transverse dimension substantially greater than their thickness. Transversely, the minor louvers may be perpendicular or inclined to the wide surface of the major louvers. The minor louvers 3 extend longitudinally of the major louvers 1 and have a center to center spacing dependent upon the desired length of the eclipse zone arc, the width of the minor louvers and the angular relationship between the minor louvers and the major louvers.

The angular relationship between the minor louvers 3 and the surface plane of the major louvers may vary between 45° and 90°. An angle of less than 70°, however, is not regarded as having functional merit, except in those particular instances where only a specifically selected portion of the available, diffused light is desired. In Figs. 1 through 4, this angle is illustrated as being 90°. In the following discussion this particular angular relationship is assumed.

The major louvers 1 are shown to be of such width and spacing that when inclined at 45°, they will entirely intercept sunlight approaching the blind horizontally (Fig. 1). The major louvers overlap only sufficiently to prevent this horizontal light from passing between them. The minor louvers 3, because of their width and spacing, prevent the passage of this beam through the major louvers 1. In the embodiment shown the width of the minor louvers is equal to their spacing. However, a portion of the light approaching at any angle between slightly above the horizon and the zenith and at any angle slightly below the horizon and the nadir, will pass through the blind. When the major louvers 1 are at the angular position shown in Fig. 1, a maximum percentage of the light approaching from 45° above the horizon (arrow B) will pass through the major louvers 1. The percentage of light intercepted will increase progressively as the angle of the incident light deviates from that of 45° above and below the horizon. All light approaching from or near zenith, nadir or the horizon will be intercepted. A maximum of light approaching from an angle of 45° below the horizon (arrow C) will pass between the major louvers. A maximum of light approaching from an angle of 45° above the horizon (arrow B) will pass through the major louvers. Of the light approaching from an angle of 45° above and below the horizontal, only that intercepted by the thickness of the major or of the minor louvers will fail to pass through the blind.

When the blind is applied to shade a vertical opening such as a window, the angle of incidence of the sunlight can be considered as the arc of rotation about a horizontal axis in the plane of the window required of a plane to change its disposition from horizontal to an inclined angle which includes the sun. Considered in this manner the sun's position, from the viewpoint of shading a window with longitudinally horizontal louvers, can be defined by this single elevation angle, hereinafter referred to as the "shadow angle," and the angle of sun azimuth can be ignored. The shadow angle is the angle to which the louvers of a conventional Venetian blind must be turned to make the plane of the louvers parallel to the incident sunlight. Therefore, the diagrammatic presentations in Figs. 1 through 4 present true relationships of incident sunlight to the blind even though they are shown merely in a single dimension and may represent an infinite number of combinations of sun azimuth with absolute altitude.

As the major louvers 1 rotate with the increasing elevation of the sun, the angle of approach of light capable of passing through the blind with least interception also changes (arrows B and C). This is graphically shown in Figs. 2 through 4 by the changing positions of the arrows A, B and C. In Fig. 2 the shadow angle is 30°, Fig. 3, 45° and Fig. 4, 75°. When the sun reaches zenith, light approaching the blind along a plane 45° above or below the horizon passes through the blind with the least interception. The only difference between this condition and the condition shown in Fig. 1 is that the arrows B and C will have exchanged positions.

The maximum elevation of the sun is dependent upon the latitude at which the opening is located. After the sun reaches its maximum elevation its subsequent descent, if the window is so orientated as to face it during the descent, will necessitate a reversal in the direction of movement of the louvers. As the sun's elevation decreases, the louvers must be rotated back to their original position, maintaining the direct radiation of the sun in their zone of total eclipse.

The above description has assumed the lateral plane of the minor louvers to be normal to the lateral plane of the major louvers. When a woven sunscreen fabric of the type disclosed in Patents No. 2,078,940, issued May 4, 1937, and No. 2,194,222, issued May 19, 1940, or a perforated sheet type screen of the type disclosed in Patent No. 2,319,225, issued May 18, 1943, is used for the major louvers 1a (Fig. 5), the minor louvers 3a, as this screen fabric is presently manufactured, will be inclined 17° to the plane of the major louvers. The effect of this inclination is a shift in the position of the eclipse zone with respect to the plane of the major louvers. This shift is shown as angle α in which the angle of approach of direct sunlight, indicated by arrow A is the same as that in Fig. 1. The angle of inclination of the major louvers 1a is changed to compensate for the inclination of the minor louvers 3a.

My invention may be applied to skylights of either the inclined or flat variety. In the case of flat skylights the range of sun shadow angles may occupy a full hemisphere of sky rather than a quadrisphere as with a vertical window. However, except in extreme northern or southern latitudes, the shadow angles of the sky quadrisphere away from the Equator represent rising or setting suns of relatively low intensity. Thus in the continental United States only the southerly half of the sky dome requires, for practical purposes, complete eclipse of direct sunlight. Effective eclipsing of a skylight may be produced by major louvers having the minor louvers either normal or inclined to the lateral plane of the major louver. Where, however, the minor louvers are not inclined to the lateral plane of the major louver, maintaining alignment between the eclipse zone and direct solar radiation results in appreciable reduction of the admission of diffused light during the latter part of the day. Whether the minor louvers are normal or inclined to the plane of the major louvers, an eclipse of direct solar radiation can be maintained throughout the day with reversal of the direction of movement of the louvers.

Whether the minor louvers are normal or inclined to the plane of the major louvers, the important feature in either case is that the major and minor louvers both overlap and intercept the light rays from a given direction but that only the major louvers overlap and intercept light rays from another direction, permitting light to pass through the minor louvers. This is more clearly illustrated by Fig. 4.

Fig. 4 illustrates light rays A from one direction intercepting the plane P through the rotatable axis of the major louvers. These light rays are intercepted by the major louvers 2 and minor louvers 3 which overlap when viewed in the direction indicated by arrow A. This overlap is more clearly understood by projecting the two louvers on to the plane surface of projection 74. The projection of the upper louver 3 is represented by line 75 and the projection of the lower louver 3 by line 76. These lines 75 and 76 overlap, thus the major louvers 3 intercept light shining in the direction of arrow A. The projections of the minor louvers 3 on plane 74 are represented by lines 77 and 78 which also overlap and intercept the light shining in the direction of arrow A.

The relationship of the major and minor louvers as seen in the direction of arrow B is similarly illustrated by projecting the louvers on the plane surface of the projection 79. The projection produces the major louver projections 80 and 81 which overlap and thus intercept light shining in the direction of arrow B. However, the minor louvers 3 are substantially perpendicular to plane 79 and thus their projection on the plane is represented by the points 82. Obviously, then the minor louvers 3 permit light from the direction of arrow B to pass through the spaces therebetween.

In the following description, the major louvers 20 are assumed to have been fabricated from sunscreen fabric of the type disclosed in Patents Nos. 2,078,940 and 2,194,222, having a minor louver inclination of 17°. The axis of the major louvers 1a is assumed to be north and south. The positions of the major louvers 20 are graphically presented in Figs. 6 through 12 at shadow angles of 0° (Fig. 6), 45° (Fig. 7), 60° (Fig. 8), 90° (Fig. 9), 120° (Fig. 10), 135° (Fig. 11) and 150° (Fig. 12). The louvers will rotate with the changing position of the sun and frequently will rotate more than 90°. With a north and south axis the major louvers will continue their rotation in the same direction until they contact each other as their upper ends approach a westerly oriented, horizontal position. The louvers 20 will assume this position sometime before sunset and remain there until sunset. At sunset, the louvers of the skylight blind will be returned either manually or automatically to their original position.

In the case of skylight blinds, even in the polar regions, latitude is immaterial. The actual elevation of the sun above the south and north horizon is immaterial because the apparent movement of the sun across the sky with respect to the blind will be the same as if it passed through the sky's zenith. In a region north of the Arctic Circle during a period of constant sunlight, the louvers 20 will merely move in one direction for a portion of the twenty-four hour period, dwell, then move in the opposite direction for a similar period. The louvers will again dwell when the sun approaches its starting position, here assumed to be east. The operation will be the same as if the sun reciprocated back and forth across the zenith without the intervention of night.

The skylight louvers 20 may utilize minor louvers 21 either normal or inclined to the plane of the major louvers. If the minor louvers 21 are normal to the plane of the major louvers 20, the major louvers will be inclined at 45° to the direct solar radiation to eclipse it. The inclination will be such that the upper end of the major louvers will point toward the sky quadrant containing the sun. As the elevation of the sun increases the angle of the major louvers 20 will change correspondingly, always maintaining a lead of 45° on the sun. Thus, when the sun is at zenith, the angle of the major louvers 20 will be 135°. Due to the necessary overlap of the major louvers 20 they cannot travel a full 180°. They will lock against each other at about 150° the louvers 20 will cease rotation and remain fixed for the rest of the day with the major louvers 20 locked against each other to prevent leakage of direct solar radiation between them.

When the major louvers are thus rotated into contacting position they are substantially less efficient in the admission of light since light may enter through the major louvers 20 only but not between them.

This situation can be relieved by using louvers in which the minor louvers 21 are inclined to the plane of the major louvers 20. Although this locked position will occur, irrespective of the inclination, it can be delayed substantially. The angle at which the major louvers 20 must lead the sun will be reduced by the amount of inclination of the minor louvers 21. If the inclination is 17°, the major louvers 20 will be inclined only 28° at sunrise. They will not reach maximum rotation until the sun reaches 122° rather than 105°, as is the case when the minor louvers 21 are normal to the plane of the major louvers.

As a practical matter it is better to arrange the axis 22 of the major louvers east and west rather than north and south. When the major louvers are so arranged, the shadow angle in the northern latitudes from the fall equinox to the spring equinox is a matter of elevation confined to the southern quadrant. From the spring equinox to the fall equinox the sun will enter the northern quadrant in early morning and late afternoon. How far it enters the northern quadrant will depend upon the latitude involved.

In the latitudes south of the Equator, the inverse of the conditions prevailing north of the Equator will exist. In the Torrid Zone between the Tropics of Cancer and Capricorn the sun will, during the year, traverse both the northern and southern quadrants but the deviation from the zenith will never exceed 23½° plus the latitude.

Assuming the axis of the major louvers 20 to be east and west and the conditions to be those prevailing north of the Tropic of Cancer during the winter season, the operation of the major louvers of the skylight blind is properly shown in Figs. 6 through 9 because the sun's shadow angle never passes zenith. Depending upon the particular day involved, the shadow angle of the sun will reach a somewhat less than 90° elevation. Under the conditions prevailing during the summer season the sun enters the northern quadrant twice during the day. Depending upon the angle assumed by the sun in the northern quadrant, this will necessitate movement of the louvers into the positions shown in Figs. 10, 11 and 12. When the axes 22 of the major louvers 20 are arranged east and west, under such conditions, the louvers progressively assume the positions shown in Figs. 12 through 8 and then return to the position shown in Fig. 12. Substantially the conditions shown in Fig. 8 will prevail at noon at 45° latitude. It is, of course, understood that Fig. 8 merely represents a theoretical condition because the actual shadow angle may be somewhat more or less than the 60° angle illustrated.

For practical purposes heat due to solar radiation entering through a skylight is relatively insignificant when the true elevation of the sun is less than 30°. Except in the higher latitudes, the shadow angle has entered the first quadrant before the sun's true elevation exceeds 30°. Thus, it is only essential that the louvers be able to effectively eclipse direct, solar radiation approaching from the first quadrant.

My invention effectively intercepts all direct solar radiation. At the same time, it admits a major portion of the available diffused light approaching from either side of the eclipse zone. In the case of a conventional adjustable blind a major portion of this light is intercepted along with the direct sunlight. Only a minor sector of the hemisphere visible through an opening needs to be eclipsed at any one time to eliminate the glare and heat of direct sunlight. My invention provides this narrow eclipse zone with only minor interception of the reflected and refracted light.

In the description of my invention as it is applied to windows and similar vertical openings it has been assumed that the louvers were arranged horizontally. It will be recognized that they could also be arranged vertically. Vertical arrangement of the louvers would produce conditions similar to those experienced with a skylight because the shadow angle of the sun would be dependent solely upon the sun's azimuth position, its elevation being immaterial. Thus, the louver movements would be represented by the conditions graphically presented in Figs. 6 through 12 rather than Figs. 1 through 4.

In the construction of louvers for an adjustable blind embodying my invention, it is sometimes desirable to enclose the minor louvers of each major louver in a transparent case. This provides rigid support for the thin, minor louvers and protects them against damage from accidental blows. This exterior protection serves the further purpose of sealing the spaces between the minor louvers against dirt, thus eliminating what could become a serious cleaning problem.

One form of enclosure for the major louvers consists of a pair of transparent sheets 30 (Figs. 14 and 15), one covering each broad face of the major louver 31. The transparent sheets 30 are preferably of plastic material such as polyethylene to obtain the advantages of light weight, strength and ease in manufacture. At each end the louver 31 has a small block 32 mounting the louver pivot 33. The pivot 33 provides means about which the louver may rotate. The facing sheets 30 are so spaced that they merely contact the edges of the minor louvers 44 sufficiently to grip them. The spaces between the minor louvers 45 must not be filled with the facing material because the material will cause light leakage around the minor louvers 45 by refraction and reflection.

While the sheet 30 on the face of the louver exposed to the sun must be transparent so that the rays of direct solar radiation striking the minor louvers are parallel to prevent light leakage, the sheet 30 on the other face of the louver can advantageously be of translucent material. This will soften the light by diffusion and make it possible to use the blind as a curtain to prevent observation through the window such as when it is used in a bedroom or bathroom.

Under some circumstances it may be desirable to entirely encase the major louver by covering not only the broad surfaces but also the ends and edges (Fig. 16). In this case the louver 40 is covered on its faces by the sheets 41. Its top and bottom edges are held by the strips 42 and its ends by the strips 43. The pivots 44 about which the louvers 40 rotate are either attached to the end strips 43 or molded integral with them. Major louvers so constructed are encased but not filled, leaving the spaces between the minor louver empty to prevent light leakage. Again the encasing material on the inner face of the louver may be translucent rather than transparent.

The minor louvers 45 may either be individual strips 45 held in position by the facing sheets 41 (Fig. 16) or they may be independently held together by warp wires 46 (Fig. 14), if the louvers are fabricated from screen cloth of the type disclosed in U.S. Patents 2,078,940 and 2,194,222. Even in the latter case the facing sheets 30 will afford appreciable support for the louvers 44.

Sunscreen of the type disclosed in U.S. Patents 2,078,940 and 2,194,222 is adapted to use without any type of supporting enclosure. The screen forming the louver 50 may be securely gripped by a suitable frame 51 on each end (Fig. 13) and placed under tension, pulling it taut and straight. This is the simplest of all constructions. In this case, the pivots 52 must be provided with some means to support them not only for rotation but to hold the tension applied to the louver 50. The minor louvers 45 are held in proper spacing and inclination not only by the tension but also by the warp wires 46.

The minor louvers may each consist of thin strips of opaque, plastic, bronze or aluminum material.

The major louvers may also be of a type in which the minor louvers 60 are fabricated from a single sheet of material (Figs. 17 and 18) such as is shown in U.S. Patent No. 2,319,225. In this case the minor louvers 60 are really thin webs separating perforation 61 in the sheet. The minor louvers 60 are supported and spaced by legs 62 extending from one minor louver to another and integral with the minor louvers on each of their ends.

By the provision of a suitable mechanism forming no part of this invention, for automatically adjusting the inclination of the major louvers, the sector or zone of eclipse may be caused to track the apparent movement of the sun, thereby always maintaining complete eclipse of all direct solar radiation. Thus, my invention provides an efficient and simple means by which substantially the entire benefit of exterior lighting may be obtained without the undesirable heat and glare attendant the admission of direct sunlight.

It will be recognized that many variations of my invention may be made without departing from the principle of a major and minor louver combination. Each of these variations of my invention is to be considered as included in the hereinafter appended claims unless these claims by their language specifically state otherwise.

I claim:

1. An adjustable blind having a plurality of elongated equally spaced, thin major louvers, said major louvers each lying on a separate plane normally parallel to the planes of the other major louvers and each having a longitudinal axis of rotation lying on a given plane intersecting the planes of said louvers: means individually supporting each of said major louvers for rotation about its longitudinal axis of rotation for changing the inclination of the planes of said louvers with respect to said given plane; each of said major louvers being comprised of a plurality of equally spaced, thin, parallel minor louvers extending longitudinally of said major louvers; each of said minor louvers extending at an angle to the plane of its major louvers; said louvers being arranged so that one projection of said blind on a first plane surface of projection arranged perpendicular to a first line of sight intersecting said given plane at a first angle shows the major louvers overlapping and another projection of said blind on a second plane surface of projection arranged perpendicular to a second line of sight intersecting said given plane at a second angle shows the major louvers overlapping; said minor louvers each being arranged with relation to the plane of its major louver so that at said one position of said major louvers the one projection of said blind on said first plane surface of projection shows the minor louvers overlapping whereas the other projection of said blind on said second plane surface of projection shows the minor louvers not overlapping whereby a beam of light projected along said first line of sight will be intercepted by both the major and minor louvers and a beam of light projected along said second line of sight will be admitted through the spaces between the minor louvers.

2. An adjustable blind having a plurality of elongated equally spaced, thin major louvers, said major louvers being spaced a distance less than the width of one major louver and each lying on a separate plane normally parallel to the planes of the other major louvers and each having a longitudinal axis of rotation lying on a given plane intersecting the planes of said major louvers; means individually supporting each of said major louvers for rotation about its longitudinal axis of rotation for changing the inclination of the planes of said major louvers with respect to said given plane; each of said major louvers being comprised of a plurality of equally spaced, thin, parallel minor louvers extending longitudinally of said major louvers; each of said minor louvers extending at an angle to the plane of its major louver; said major louvers being arranged so that one projection of said blind on a first plane surface of projection arranged perpendicular to a first line of sight intersecting said given plane at a first angle shows the major louvers overlapping and another projection of said blind on a second plane surface of projection arranged perpendicular to a second line of sight intersecting said given plane at a second angle shows the major louvers overlapping; said minor louvers each being arranged with relation to the plane of its major louver so that at said one position of said major louvers the one projection of said blind on said first plane surface of projection shows the minor louvers overlapping whereas the other projection of said blind on said second plane surface of projection shows the minor louvers not overlapping whereby a beam of light projected along said first line of sight will be intercepted by both the major and minor louvers and a beam of light projected along said second line of sight will be admitted through the spaces between the minor louvers.

3. An adjustable blind having a plurality of elongated equally spaced, thin major louvers, said major louvers each lying on a separate plane normally parallel to the planes of the other major louvers and each having a longitudinal axis of rotation lying on a given plane intersecting the planes of said louvers: means individually supporting each of said major louvers for rotation about its longitudinal axis of rotation for changing the inclination of the planes of said louvers with respect to said given plane; each of said major louvers being comprised of a plurality of equally spaced, thin parallel minor louvers spaced one from the other a distance less than the width of one minor louver and extending longitudinally of said major louvers; each of said minor louvers extending at an angle to the plane of its major louver; said major louvers being arranged so that one projection of said blind on a first plane surface of projection arranged perpendicular to a first line of sight intersecting said given plane at a first angle shows the major louvers overlapping and another projection of said blind on a second plane surface of projection arranged perpendicular to a second line of sight intersecting said given plane at a second angle also shows the major louvers overlapping; said minor louvers each being arranged with relation to the plane of its major louver so that at said one position of said major louvers the one projection of said blind on said first plane surface of projection shows the minor louvers overlapping whereas the other projection of said blind on said second plane surface of projection shows the minor louvers not overlapping whereby a beam of light projected along said first line of sight will be intercepted by both the major and minor louvers and a beam of light projected along said second line of sight will be admitted through the spaces between the minor louvers.

4. An adjustable blind having a plurality of elongated equally spaced, thin major louvers, said major louvers being spaced a distance less than the width of one major louver and each lying on a separate plane normally parallel to the planes of the other major louvers and each having a longitudinal axis of rotation lying on a given plane intersecting the planes of said major louvers: means individually supporting each of said major louvers for rotation about its longitudinal axis of rotation for changing the inclination of the planes of said major louvers with respect to said given plane; each of said major louvers being comprised of a plurality of equally spaced, thin parallel minor louvers spaced one from the other a distance less than the width of one minor louver and extending longitudinally of said major louvers; each of said minor louvers extending at an angle to the plane of its major louver; said major louvers being arranged so that one projection of said blind on a first plane surface of projection arranged perpendicular to a first line of sight intersecting said given plane at a first angle shows the major louvers overlapping and another projection of said blind on a second plane surface of projection arranged perpendicular to a second line of sight intersecting said given plane at a second angle shows the major louvers overlapping; said minor louvers each being arranged with relation to the plane of its major louver so that at said one position of said major louvers the projection of said blind on said first plane surface of projection shows the minor louvers overlapping whereas the projection of said blind on said second plane surface of projection shows the minor louvers not overlapping whereby a beam of light projected along said first line of sight will be intercepted by both the major and minor louvers and a beam of light projected along said second line of sight will be admitted through the spaces between the minor louvers.

References Cited in the file of this patent
UNITED STATES PATENTS

| | | |
|---|---|---|
| 2,152,705 | Mortimer | Apr. 4, 1939 |
| 2,194,222 | Ewing | Mar. 19, 1940 |
| 2,382,566 | Heckman | Apr. 14, 1945 |